(12) United States Patent
Wang

(10) Patent No.: US 7,019,055 B2
(45) Date of Patent: Mar. 28, 2006

(54) STABILIZATION OF POLYMERS AFTER EXPOSURE TO OXIDATION

(76) Inventor: Qi Wang, 2189 Bedell Rd., Apt. #5, Grand Island, NY (US) 14072

( * ) Notice: Subject to any disclaimer, the term of this patent is extended or adjusted under 35 U.S.C. 154(b) by 643 days.

(21) Appl. No.: 09/761,625

(22) Filed: Jan. 17, 2001

(65) Prior Publication Data

US 2001/0007884 A1   Jul. 12, 2001

Related U.S. Application Data

(63) Continuation-in-part of application No. 09/272,843, filed on Mar. 19, 1999, now abandoned.

(51) Int. Cl.
 C08K 5/06   (2006.01)
 C08L 23/04  (2006.01)
 C08L 23/10  (2006.01)
 C08L 27/06  (2006.01)
 C08L 69/00  (2006.01)

(52) U.S. Cl. .............. 524/107; 524/111; 524/366; 524/368; 524/378; 524/567; 524/583; 524/585; 524/590; 524/108

(58) Field of Classification Search .............. 524/81, 524/85, 369, 108, 113, 107, 111, 567, 583, 524/585, 590, 366, 368, 378
See application file for complete search history.

(56) References Cited

U.S. PATENT DOCUMENTS 4,686,148 A * 8/1987 Havens ................. 428/520
5,352,721 A * 10/1994 Takayanagi et al. ...... 524/183
5,760,171 A * 6/1998 White et al. ............ 524/292

FOREIGN PATENT DOCUMENTS

GB    1560765 A  * 2/1980

OTHER PUBLICATIONS

"Condensed Chemical Dictionary 13th Ed., " by Richard J. Lewis, p. 106 (1997).*
"Organic Chemistry 5th Ed.", by Morrison and Boyd., p. 415-418, 477, 478 and 488 (1987).*
"Organic Chemistry 5th ed.", by John McMurry, p. 580 (2000).*

* cited by examiner

Primary Examiner—Kelechi C. Egwim
(74) Attorney, Agent, or Firm—Richard D. Fuerle

(57) ABSTRACT

A polymer of polyvinyl chloride, polyvinylidene chloride, polycarbonate, polyethylene, polypropylene, polyimide, polyester, or polyvinyl acetate contains about 0.005 to about 10 phr of a stabilizer to prevent discoloration due to oxidation, particularly gamma radiation.

24 Claims, No Drawings

US 7,019,055 B2

1

STABILIZATION OF POLYMERS AFTER EXPOSURE TO OXIDATION

BACKGROUND OF THE INVENTION

This application is a continuation-in-part of application Ser. No. 09/272,843, filed Mar. 19, 1999, now abandoned.

This invention relates to the use of stabilizers to reduce the discoloration of certain polymers after they have been exposed to oxidation. In particular, it relates to the use of derivatives of certain unsaturated diols for that purpose.

A number of different polymers, including polyvinyl chloride (PVC), polycarbonates, polyurethane, polyethylene, and polypropylene, are used to make various medical devices and as packaging for food. Sterilization can be accomplished by exposing the devices or packages to gamma radiation. However, the gamma radiation can degrade or yellow the polymer, making it unsuitable or less acceptable for certain applications. Polymers such as polyethylene, polypropylene, and PVC can also degrade and yellow after heating.

SUMMARY OF THE INVENTION

We have discovered that when a particular type of stabilizer is added to certain polymers, the polymers degrade and yellow substantially less after exposure to oxidation. Some of the stabilizers of this invention are novel compounds while others are commercially available. Some of these stabilizers are polymeric and resist leaching or migration from the polymer, thereby further extending the life of the polymer.

DESCRIPTION OF THE PREFERRED EMBODIMENTS

The stabilizers of this invention have the general formula:

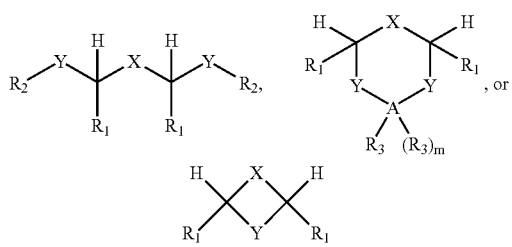

where A is C, P, Sn, Si, or B, X is $-R_1C=CR_1-$, $-C\equiv C-$,

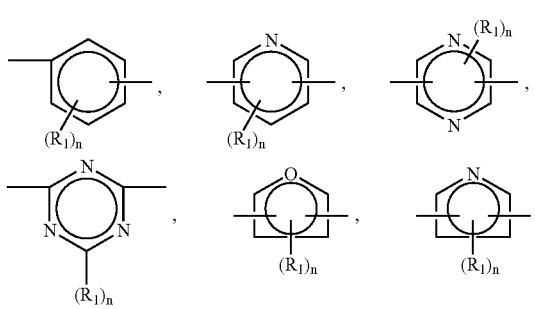

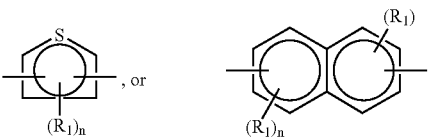

each Y is independently selected from O and S; each R is independently selected from hydrogen, alkyl from $C_1$ to $C_{20}$, aryl from $C_6$ to $C_{20}$, alkaryl from $C_7$ to $C_{20}$, and aralkyl from $C_7$ to $C_{20}$; each $R_1$ is independently selected from R, OR, RCO, ROCO, $ROCO_2$, $P(R)_2$, $P(OR)_2$, PR(OR), $N(R)_2$, $(R)_2NCO$, $(R)_2NCO_2$, SR, and halogen, where two $R_1$ groups can be bridged together to form a ring; each $R_2$ is independently selected from R, RCO, ROCO, $P(OR)_2$, $Sn(R)_p(OR)_{3-p}$, $Sn(R)_p(OCOR)_{3-p}$, $Si(R)_p(OR)_{3-p}$, and $B(R)_p(OR)_{2-p}$, except that when two Y's are O and X is $-R_1C=CR_1-$, at least one $R_2$ is not hydrogen, each $R_3$ is independently selected from R, RCO, ROCO, $ROCO_2$, OR, SR, $N(R)_2$, $OP(R)_2$, and $OP(OR)_2$; m is 0 when A is P or B and is 1 when A is Sn, Si, or C; n is 0 to 4, depending on the number of available sites; and p is 0 to 3 for the tin stabilizers and 0 to 2 for the boron stabilizers. Two $R_1$ or two $R_2$ groups or an $R_1$ group and an $R_2$ group can be bridged together to form a ring. Groups that can bridge $R_1$ or $R_2$ groups together to form a ring include $R_4$, $-HC=CH-$, $-CH_2O-$, $-CH_2NH-$, $-HC=N-$, and $-CH_2S$, where $R_4$ is alkylene from $C_1$ to $C_{20}$, arylene from $C_6$ to $C_{20}$, (aryl)alkylene from $C_7$ to $C_{20}$, (alkyl)arylene from $C_7$ to $C_{20}$, alkanediyl from $C_1$ to $C_{20}$, (aryl)alkanediyl from $C_7$ to $C_{20}$, $-CO-(alkylene)-CO-$ from $C_1$ to $C_{20}$, $-CO-arylene-CO-$ from $C_6$ to $C_{20}$, $-CO-(aryl)alkylene-CO-$ from $C_7$ to $C_{20}$, $-CO-(alkyl)arylene-CO)-$ from $C_7$ to $C_{20}$, $Si(R)_2$, $SiR(OR)$, $Si(OR)_2$, $P(OR)$, $B(OR)$, $Sn(R)_2$, $SnR(OR)$, or $SnR(O-CO-R)$. Preferably, A is C; X is $-HC=CH-$; Y is O; R is hydrogen, alkyl from $C_1$ to $C_{12}$, aryl from $C_6$ to $C_{12}$, alkaryl from $C_7$ to $C_{12}$, or aralkyl from $C_7$ to $C_{12}$, and is most preferably benzyl; $R_1$ is H; $R_2$ is R; $R_3$ is R; $R_4$ is alkylene from $C_1$ to $C_8$, (aryl)alkylene from $C_7$ to $C_8$, or $-CO-(aryl)alkylene-CO-$ from $C_7$ to $C_8$; and p is 0 because those compounds work well and are readily available. Stabilizers where each $R_1$ is hydrogen are especially preferred as they are more effective. When X is $-R_1C=CR_1-$ the stabilizers can be either cis or trans, but the cis stabilizers are preferred because they are less expensive. The following are examples of some of the stabilizers included within the scope of the above formulas:

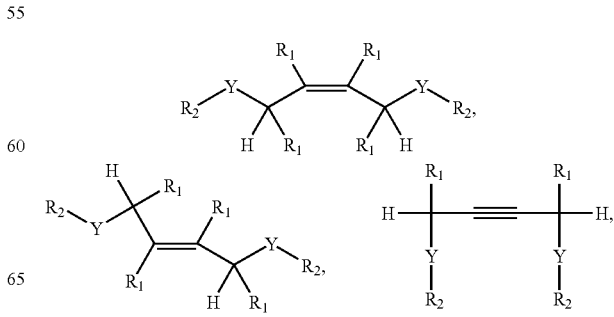

-continued
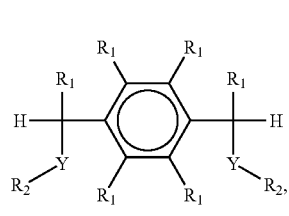 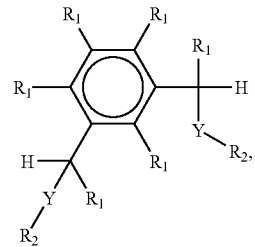
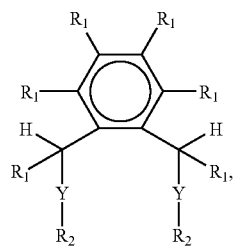 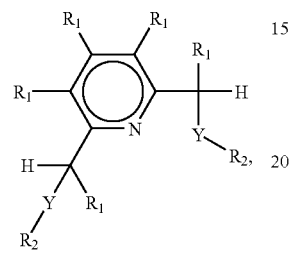
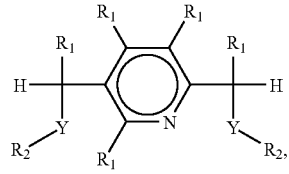 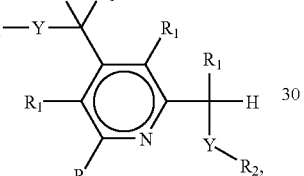
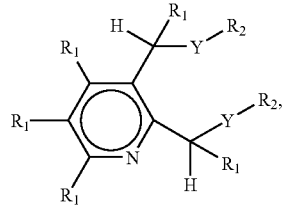 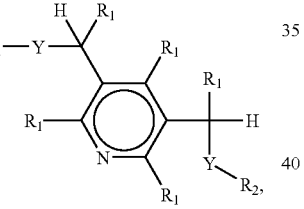
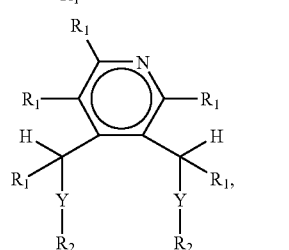 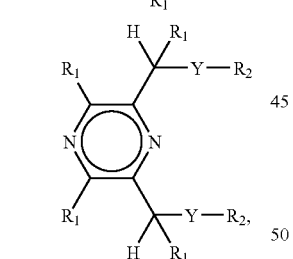
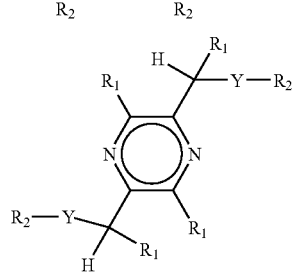 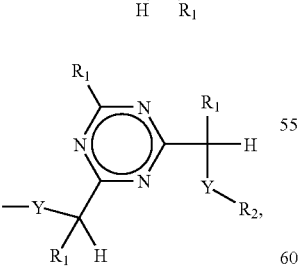
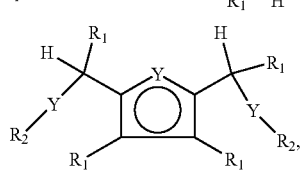
-continued
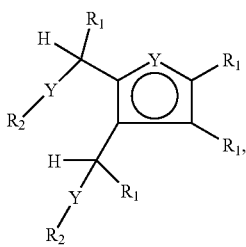
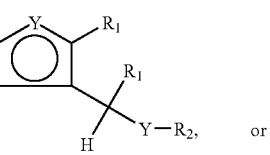
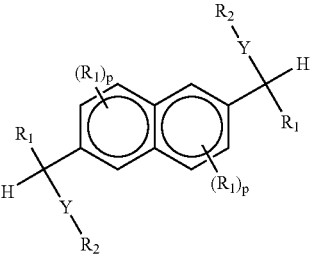
Examples of stabilizers having a cyclic structure include:
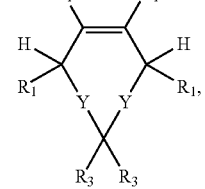 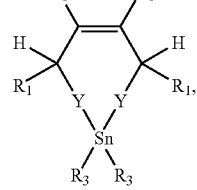
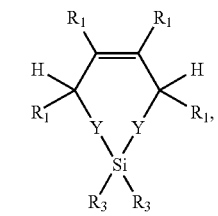 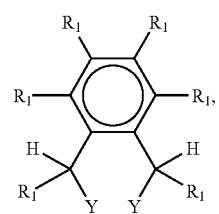
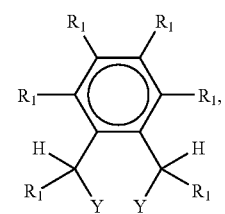 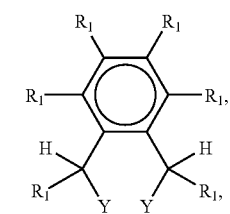
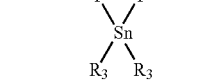 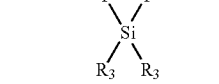

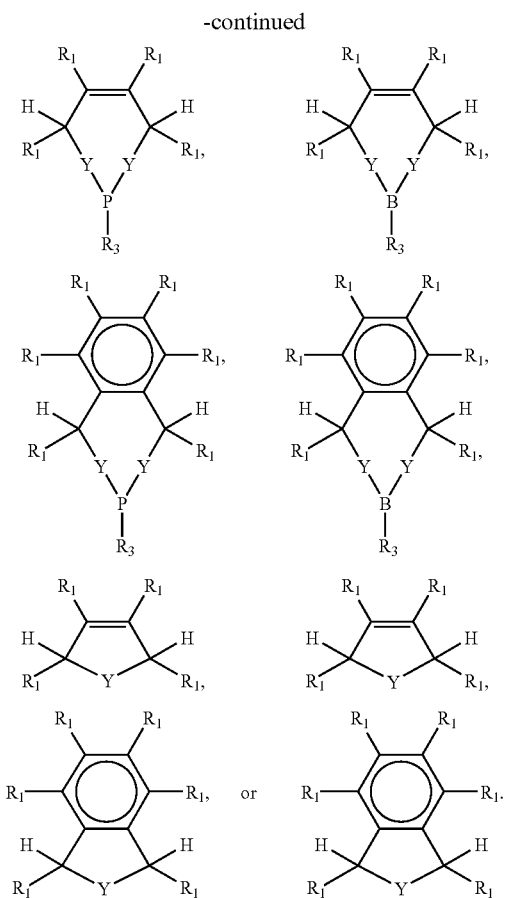

Examples of stabilizers having the above structure include 4,7-dihydro-1,3-dioxepins, ethers and esters of butene-1,4-diol, and phthalans. These stabilizers can be prepared by condensing an allylic diol, or an aromatic analog of an allylic diol, with an aldehyde, ketone, acid, acid halide, ester, alkyl halide, or alcohol or by other reactions known to those skilled in the art, to form derivatives. See, for example, "A Stereospecific Route to Aziridinomitosanes: The Synthesis of Novel Mitomycin Congeners," by Samuel Danishefshy et al. *J. Am. Chem. Soc.* 1985, 107, 3891–3898.

The stabilizers can be oligomeric or polymeric versions of the compounds shown in the first formula that have the structure:

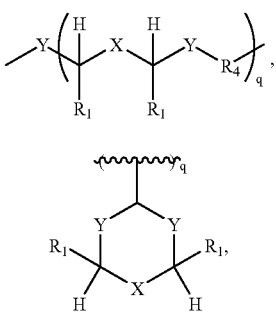

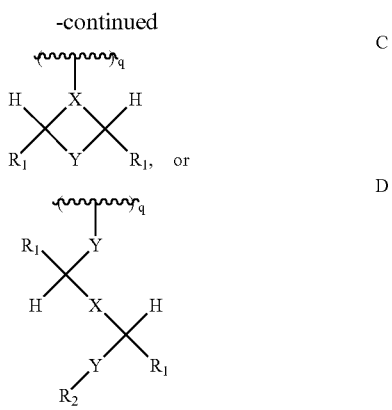

In the above formulas, q can be 1 to 1000, but is preferably 1 to 5. Examples of polymers having formula A include poly(2-butenylene adipate), poly(2-butenylene-terephthalate, and poly[oxy(2-butenylene)]. In formulas B, C, and D, the preferred backbones are polyesters, polyethers, and polyketones, and the preferred pendant groups are

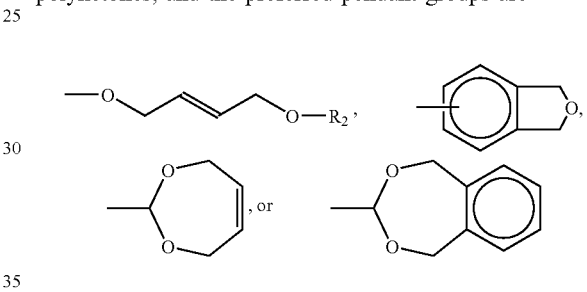

Examples of such compounds include the condensate of poly(ethylene-co-carbon monoxide) with 2-butene-1,4-diol. The polymeric stabilizers are expected to be more effective as they have less tendency to migrate or leach out of the stabilized polymer. Preparation of these polymers can be achieved by reactions known to those skilled in the art. For example, the polymeric esters can be prepared by reacting the diol (see the first formulas where Y is oxygen and $R_1$ is hydrogen) with a diester, diacid, diacid chloride, or dianhydride.

The stabilizers of this invention are effective against oxidation of PVC, polycarbonates, polyurethane, polypropylene, polyethylene, polyvinylidene chloride, polyimides, polyesters, polysiloxanes, polyurethanes, polysulfones, and polysulfides. The preferred polymers are PVC, polycarbonates, polypropylene, and polyethylene because those polymers are more frequently used in medical applications where they are subjected to gamma radiation; particularly preferred is PVC.

The polymer can be stabilized by the addition of about 0.005 to about 10 phr (parts by weight per 100 part by weight of the polymer) of the stabilizer to the polymer. Less stabilizer is less effective and more stabilizer offers little additional benefit. The preferred amount of stabilizer is about 0.2 to about 6 phr. The stabilizer can be added to a polymer in a variety of ways, such as mixing into the reactants at the beginning or during polymerization. The stabilizer is preferably added after at least 70 wt % of the monomer has polymerized. The stabilizer can be added as a solid or with a solvent as a slurry or a solution. Common organic solvents such as N-methylpyrrolidone, diglyme, acetamide, acetone, methanol, ethanol, isopropanol, dimethylsulfoxide, and dimethylformamide can be used; water can also be used. Water miscible solvents, such as acetone, tetrahydrofuran, and methanol, are preferred for PVC. It is preferable to add the stabilizer in a solvent as that achieves a more uniform distribution of the stabilizer in the polymer. The stabilizer can also be added during the drying or compounding of the polymer. Various methods can be used for compounding, including milling, dry mixing, and extrusion. The stabilizers function as antioxidants to inhibit various forms of oxidation.

The following examples further illustrate this invention:

EXAMPLES 1 to 13

To a mixture of 150.00 g PVC (sold by Occidental Chemical Corporation as "Oxy 240"), 0.30 g stearic acid (used as a lubricant), 0.23 g of zinc and calcium mixed salts of mixed fatty acids (used as a heat stabilizer; sold by Witco as "Mark 152 S"), 97.50 g dioctyl phthalate (used as a heat stabilizer and to increase flexibility), 15.00 g epoxidized soy bean oil (used as an HCl scavenger to reduce degradation; sold by Witco as "Drapex 6.8"), was added a stabilizer. The mixture was thoroughly blended and hot milled at 300° F. (149° C.) for 5 minutes. The resulting PVC sheet was cut and pressed into a 4"×3"×¼" (10×8×0.6 cm) plaque at 330° F. (166° C.). The plaque was divided into two smaller pieces. One was saved for comparison and one was subjected to γ radiation at a dose of 50 kGy. The irradiated piece was again divided into two pieces and one of these pieces was oven aged at 50° C. for 48 hours. All of the samples were measured for yellowness index with a Macbeth 2020 Plus Color Eye Spectrometer, as described by the Hunter equations (see "The Measurement of Appearance" by Richard S. Hunter, John Wiley & Sons, New York, 1975). The stabilizers used in Examples 1 to 6 and 8 to 11 were purchased and the stabilizer used in Example 7 was made according to U.S. Pat. No. 3,280,148. The following table gives the stabilizers used and the results.

| Example | Stabilizer | Amount (g) | Yellowness Initial | Yellowness After Radiation | Yellowness After Aging |
|---|---|---|---|---|---|
| 1 | 2,5-dimethoxy-2,5-dihydrofuran | 0.64 | 17.1 | 47.8 | 69.3 |
| Control | none | | 18.4 | 52.8 | 74.1 |
| 2 | phthalan | 1.34 | 17.5 | 31.9 | 49.5 |
| Control | none | | 18.1 | 50.2 | 75.5 |
| 3* | cis-4-benzyloxy-2-buten-1-ol | 1.67 | 16.6 | 21.1 | 30.7 |
| Control | none | | 16.3 | 43.3 | 66.6 |
| 4 | 1,4-dibenzyloxy-2-butene | 2.23 | 17.6 | 23.9 | 38.2 |
| Control | none | | 16.3 | 43.3 | 66.6 |
| 5 | trans-2,3-dibromo-2-butene-1,4-diol | 2.06 | 31.8 | 37.6 | 61.7 |
| Control | none | | 16.3 | 43.3 | 66.6 |
| 6 | 4,7-dihydro-2-phenyl-1,3-dioxepin | 1.47 | 16.1 | 26.0 | 41.1 |
| Control | none | | 16.3 | 43.3 | 66.6 |
| 7 | 2,2'-(1,4-phenylene)bis(4,7-dihydro-1,3-dioxepin) | 2.40 | 24.3 | 36.5 | 40.9 |
| Control | none | | 18.1 | 50.2 | 75.5 |
| 8 | 1,5-dihydro-3-methoxy-2,4-benzodioxepin | 2.03 | 16.7 | 36.0 | 49.8 |
| Control | none | | 18.1 | 50.2 | 75.5 |
| 9 | 2-butyne-1,4-diol | 0.96 | 18.0 | 39.9 | 62.9 |
| Control | none | | 18.1 | 50.2 | 75.5 |
| 10 | 1,4-bis(2-hydroxyethoxy)-2-butyne | 1.99 | 32.0 | 31.6 | 40.2 |
| Control | none | | 18.1 | 50.2 | 75.5 |
| 11 | 1,4-benzenedimethanol | 1.50 | 21.0 | 41.1 | 47.7 |
| Control | none | | 18.1 | 50.2 | 75.5 |

*See also "Convenient One-pot Synthesis of (Z)-4-Benzyloxy-2-buten-1-ol," by S. V. Hiremath et al. Indian Journal of Chemistry, Vol. 27B, June 1988, p. 588.

As can be observed from the above table, after γ radiation the polymers that contained a stabilizer had significantly less discoloration than the control samples.

I claim:

1. A polymer which comprises polyvinyl chloride, polycarbonate, polyurethane, polyethylene, or polypropylene, containing about 0.005 to about 10 phr of a stabilizer having the formula:

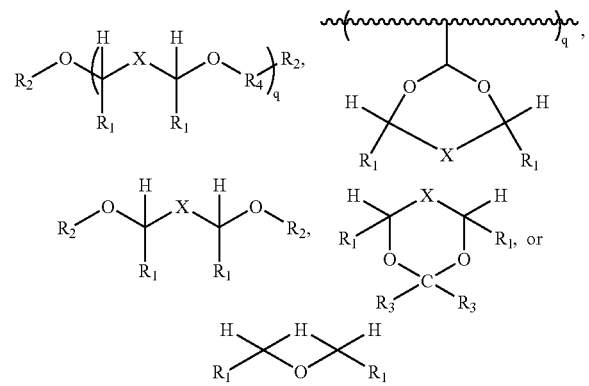

where X is $-R_1C=CR_1-$, $-C\equiv C-$, or

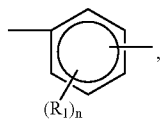

each R is independently selected from hydrogen and R', each R' is independently selected from alkyl from $C_1$ to $C_{20}$, aryl from $C_6$ to $C_{20}$, alkaryl from $C_7$ to $C_{20}$, and aralkyl from $C_7$ to $C_{20}$; each $R_1$ is independently selected from R, OR, RCO, ROCO, $ROCO_2$, $N(R)_2$, $(R)_2NCO$, $(R)_2NCO_2$, SR, and halogen; each $R_2$ is independently selected from R, RCO, and ROCO, and two $R_1$ groups, two $R_2$ groups, or an $R_1$ group and an $R_2$ group can be bridged together to form a ring, except that when X is $-R_1C=CR_1-$ at least one $R_2$ is not hydrogen; each $R_3$ is independently selected from R', RCO, ROCO, $ROCO_2$, OR, SR, and $N(R)_2$; $R_4$ is alkylene from $C_1$ to $C_{20}$, arylene from $C_6$ to $C_{20}$, (aryl)alkylene from $C_7$ to $C_{20}$, (alkyl)arylene from $C_7$ to $C_{20}$, alkanediyl from $C_1$ to $C_{20}$, (aryl)alkanediyl from $C_7$ to $C_{20}$, —CO-(alkylene)-CO— from $C_1$ to $C_{20}$, —CO-arylene-CO— from $C_6$ to $C_{20}$, —CO-(aryl)alkylene-CO— from $C_7$ to $C_{20}$, and —CO-(alkyl)arylene-CO)— from $C_7$ to $C_{20}$; and q is 1 to 1000.

2. A polymer according to claim 1 wherein said polymer is polyvinyl chloride.

3. A polymer according to claim 1 that is has been made into an article that has been sterilized with gamma radiation.

4. A polymer which comprises polyvinyl chloride, polycarbonate, polyurethane, polyethylene, or polypropylene, containing about 0.005 to about 10 phr of cis-4-benzyloxy-2-buten-1-ol.

5. A polymer according to claim 1 wherein said stabilizer is cis-1,4-dibenzyloxy-2-butene.

6. A polymer according to claim 1 wherein said stabilizer is a phthalan.

7. A polymer according to claim 1 wherein X is —R$_1$C═CR$_1$.

8. A polymer according to claim 7 wherein X is —HC═CH—.

9. A polymer according to claim 1 where each R is independently selected from hydrogen, alkyl from C$_1$ to C$_{12}$, aryl from C$_6$ to C$_{12}$, alkaryl from C$_7$ to C$_{12}$, and aralkyl from C$_7$ to C$_{12}$.

10. A polymer according to claim 1 wherein said stabilizer has the structure:

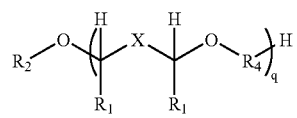

or

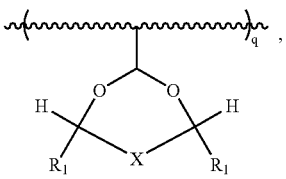

where R$_4$ is alkylene from C$_1$ to C$_8$, (aryl)alkylene from C$_7$ to C$_8$, or —CO-(aryl)alkylene-CO— from C$_7$ to C$_8$; and q is 1 to 5.

11. A polymer according to claim 10 wherein said stabilizer has the pendant group

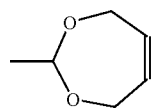

12. A polymer according to claim 10 that has been made into an article and sterilized with gamma radiation.

13. A polymer according to claim 1 wherein R is benzyl.

14. A polymer according to claim 1 wherein R$_1$ is H.

15. A polymer according to claim 1 wherein R$_2$ is R.

16. A polymer according to claim 1 wherein R$_3$ is R.

17. A polymer according to claim 1 wherein said two R$_1$ groups that can be bridged together to form a ring are selected from the group consisting of alkylene from C$_1$ to C$_8$, (aryl)alkylene from C$_7$ to C$_8$, and —CO-(aryl)alkylene-CO— from C$_7$ to C$_8$.

18. A polymer according to claim 1 wherein said stabilizer has the formula

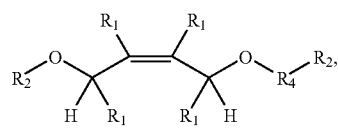

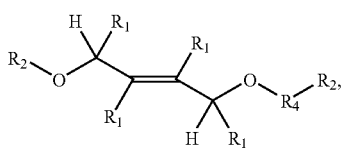

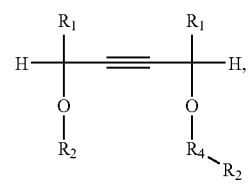

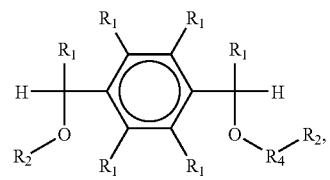

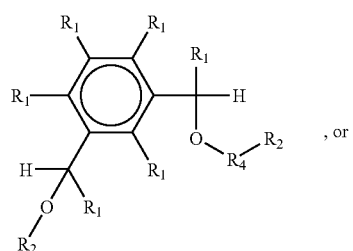

, or

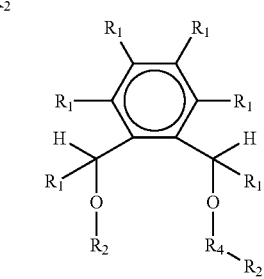

19. A polymer according to claim 1 wherein said stabilizer has the formula:

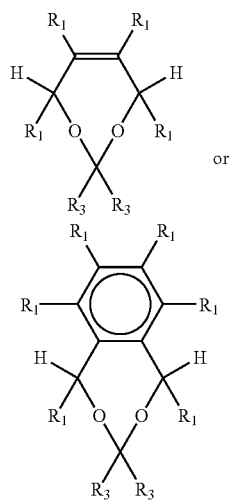

20. A polymer which comprises polyvinyl chloride, polycarbonate, polyurethane, polyethylene, or polypropylene, containing about 0.005 to about 10 phr of a stabilizer having the formula:

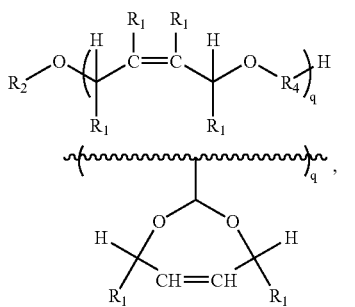

where each R is independently selected from hydrogen and R', each R' is independently selected from alkyl from $C_1$ to $C_{20}$, aryl from $C_6$ to $C_{20}$, alkaryl from $C_7$ to $C_{20}$, and aralkyl from $C_7$ to $C_{20}$; each $R_1$ is independently selected from R, OR, RCO, ROCO, $R_2$, $N(R)_2$, $(R)_2NCO$, $(R)_2NCO_2$, SR, and halogen; each $R_2$ is independently selected from R, RCO, and ROCO, and two $R_1$ groups, two $R_2$ groups, or an $R_1$ group and an $R_2$ group can be bridged together to form a ring, except that when X is —$R_1C$=$CR_1$— at least one $R_2$ is not hydrogen; $R_4$ is alkylene from $C_1$ to $C_8$, (aryl)alkylene from $C_7$ to $C_8$, or —CO-(aryl)alkylene-C— from $C_7$ to $C_8$; and q is 1 to 5.

21. A polymer according to claim 20 wherein said polymer is polyvinyl chloride.

22. A polymer according to claim 21 that has been made into an article and said article has been sterilized with gamma radiation.

23. Polyvinyl chloride, polyurethane, polyethylene, polypropylene, or polycarbonate containing about 0.2 to about 6 phr of a stabilizer having the formula:

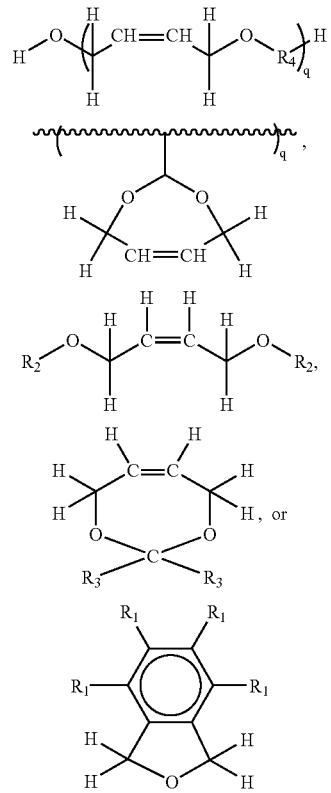

where $R_1$ is hydrogen; one $R_2$ is R and the other $R_2$ is R or hydrogen; $R_3$ is R; $R_4$ is alkylene from $C_1$ to $C_8$, (aryl)alkylene from $C_7$ to $C_8$, or —CO-(aryl)alkylene-CO— from $C_7$ to $C_8$; R is benzyl; and q is 1 to 5.

24. Polyvinyl chloride according to claim 23 that has been made into an article and said article has been sterilized with gamma radiation.

* * * * *